US011113383B2

(12) United States Patent
Ringuette et al.

(10) Patent No.: US 11,113,383 B2
(45) Date of Patent: Sep. 7, 2021

(54) PERMITTING LOGIN WITH PASSWORD HAVING DYNAMIC CHARACTER(S)

(71) Applicant: Lenovo (Singapore) Pte. Ltd., Singapore (SG)

(72) Inventors: Justin Michael Ringuette, Morrisville, NC (US); Robert James Norton, Jr., Raleigh, NC (US); Sandy Scott Collins, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 154 days.

(21) Appl. No.: 16/514,665

(22) Filed: Jul. 17, 2019

(65) Prior Publication Data

US 2021/0019391 A1    Jan. 21, 2021

(51) Int. Cl.
*G06F 21/00*  (2013.01)
*G06F 21/45*  (2013.01)
*G06F 21/32*  (2013.01)
*G06F 21/34*  (2013.01)

(52) U.S. Cl.
CPC .............. *G06F 21/45* (2013.01); *G06F 21/32* (2013.01); *G06F 21/34* (2013.01)

(58) Field of Classification Search
CPC ........... G06F 21/45; G06F 21/32; G06F 21/34
See application file for complete search history.

(56) References Cited

U.S. PATENT DOCUMENTS

| 7,093,282 | B2 * | 8/2006 | Hillhouse | G06F 21/46 380/28 |
| 8,640,227 | B2 * | 1/2014 | Taxier | G06F 21/36 726/19 |
| 10,097,557 | B2 * | 10/2018 | Armer | H04L 63/105 |
| 10,783,237 | B2 * | 9/2020 | Chen | G06F 21/45 |
| 2014/0331060 | A1 * | 11/2014 | Hayton | G06F 21/31 713/186 |
| 2016/0103987 | A1 * | 4/2016 | Yang | G06F 21/36 713/184 |
| 2017/0337366 | A1 * | 11/2017 | Lu | G06F 21/32 |
| 2018/0077131 | A1 * | 3/2018 | Averboch | H04L 63/08 |
| 2018/0137265 | A1 * | 5/2018 | Tokuyama | H04M 1/67 |
| 2019/0333523 | A1 * | 10/2019 | Kim | G06F 21/6209 |
| 2020/0167450 | A1 * | 5/2020 | Li | H04L 63/0876 |
| 2020/0327220 | A1 * | 10/2020 | Daetz | G06F 21/31 |
| 2021/0042549 | A1 * | 2/2021 | Van Os | G06K 9/22 |

* cited by examiner

*Primary Examiner* — Ghodrat Jamshidi
(74) *Attorney, Agent, or Firm* — John M. Rogitz; John L. Rogitz

(57) ABSTRACT

In one aspect, a first device includes at least one processor and storage accessible to the at least one processor. The storage includes instructions executable by the at least one processor to receive password input from a second device and to determine whether the password input indicates at least one predetermined character and at least one dynamic character that conforms to at least one preestablished parameter. The instructions are also executable to permit a login via the first device responsive to a determination that the password input indicates the at least one predetermined character and at least one dynamic character that conforms to the at least one preestablished parameter.

20 Claims, 5 Drawing Sheets

PERMITTING LOGIN WITH PASSWORD HAVING DYNAMIC CHARACTER(S)

FIELD

The present application relates to technically inventive, non-routine solutions that are necessarily rooted in computer technology and that produce concrete technical improvements. In particular, the present application relates to use of computer passwords that have dynamic characters.

BACKGROUND

As recognized herein, most passwords used to login to electronic devices and other electronic systems online are static in that they do not change unless and until a user changes them. However, these passwords can be hacked, giving an unapproved person access to the account to which the password pertains and potentially compromising sensitive information. Existing solutions to this computer-related problem are insufficient as they increase manufacturing and operating costs, often require dedicated software applications as well as additional computer hardware, and/or increase login complexity to an undesirable degree and can thus be too burdensome on a user. Thus, there are currently no adequate solutions to the foregoing computer-related, technological problem.

SUMMARY

Accordingly, in one aspect a device includes at least one processor and storage accessible to the at least one processor. The storage includes instructions executable by the at least one processor to receive password input from a second device and to determine whether the password input indicates at least one predetermined character and at least one dynamic character that conforms to at least one preestablished parameter. The instructions are also executable to permit a login via the first device responsive to a determination that the password input indicates the at least one predetermined character and at least one dynamic character that conforms to the at least one preestablished parameter.

In some embodiments, the at least one preestablished parameter may change daily and may be selected by a user associated with the password input prior to the determination. In certain examples, the at least one preestablished parameter may pertain to the current time of day when the password input is received, a day of the month on which the password input is received, a closing value of a financial index on the day before the password input is received, and/or input from a biometric sensor on a fitness tracker associated with the user.

Additionally, in some examples the at least one preestablished parameter may require the at least one dynamic character to be placed at a particular location within a password establishing the password input. For instance, the at least one dynamic character may include first and second dynamic characters, and the at least one preestablished parameter may require the first dynamic character to be placed at a first location within the password and the second dynamic character to be placed at a second, different location within the password. Also in these examples, the at least one preestablished parameter may require that the first and second dynamic characters pertain to different types of information, and may require that the first and second locations be separated in the password by at least a first predetermined character of the at least one predetermined character. Furthermore, in some implementations the first location may be established by the initial character in the password and the second location may be established by the last character in the password.

Also in some examples, the first device may be established by a server and the login may be for login to an email account, login to a content streaming service, and/or login to a website.

In another aspect, a method includes receiving, at a first device, a login attempt from a second device. The method also includes determining whether the login attempt indicates a password including at least one predetermined character and at least one dynamic character that conforms to at least one criterion, where both the at least one predetermined character and the at least one criterion are associated with a particular user account for which the login attempt is made. The method then includes logging the second device into the user account responsive to determining that the password input indicates the at least one predetermined character and at least one dynamic character that conforms to the at least one criterion.

In still another aspect, a computer readable storage medium (CRSM) that is not a transitory signal includes instructions executable by at least one processor to receive a login attempt at a device. The instructions are also executable to permit login responsive to a determination that the login attempt indicates a password including at least one dynamic character that conforms to at least one preestablished criterion. In some examples, the device may be a first device, the login may be login to the first device, and the password may not be transmitted to a second device different from the first device as part of the login attempt.

The details of present principles, both as to their structure and operation, can best be understood in reference to the accompanying drawings, in which like reference numerals refer to like parts, and in which:

DETAILED DESCRIPTION

Figure 1:
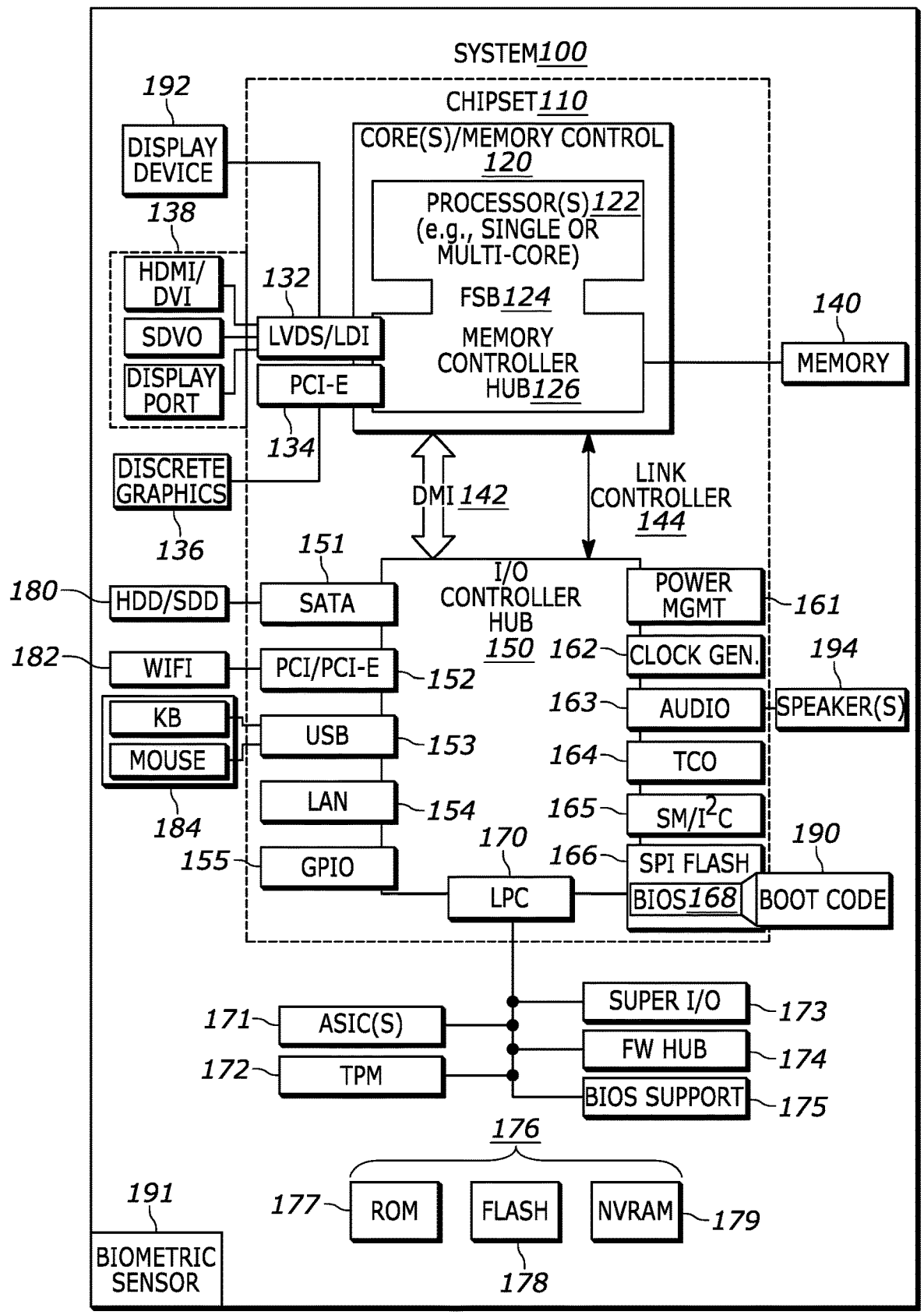
FIG. 1 is a block diagram of an example system in accordance with present principles.

It is to be understood that the detailed description below sets forth details regarding the use of a dynamic element within a password which is known to the user and might change somewhat frequently. This may be used for authentication while helping to protect the user's account should the password be compromised, e.g., hacked locally or intercepted on any given day during transmission from the user's device to a device facilitating login. As examples, the dynamic element may pertain to the current time of day in minutes, the current day of the month, the closing value of a financial index, the user's weight as logged the previous day with a fitness tracker, etc.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (RUM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMID®, etc.).

In the example of FIG. 1, the chipset 110 has a particular architecture, which may vary to some extent depending on brand or manufacturer. The architecture of the chipset 110 includes a core and memory control group 120 and an 110 controller hub 150 that exchange information data, signals, commands, etc. via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDRB, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more biometric sensors 191, such as a heart rate sensor, weight sensor, step counter, etc. Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (1R) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1, In any case, it is to be understood at least based on the foregoing that the system 100 is configured to undertake present principles.

Figure 2:
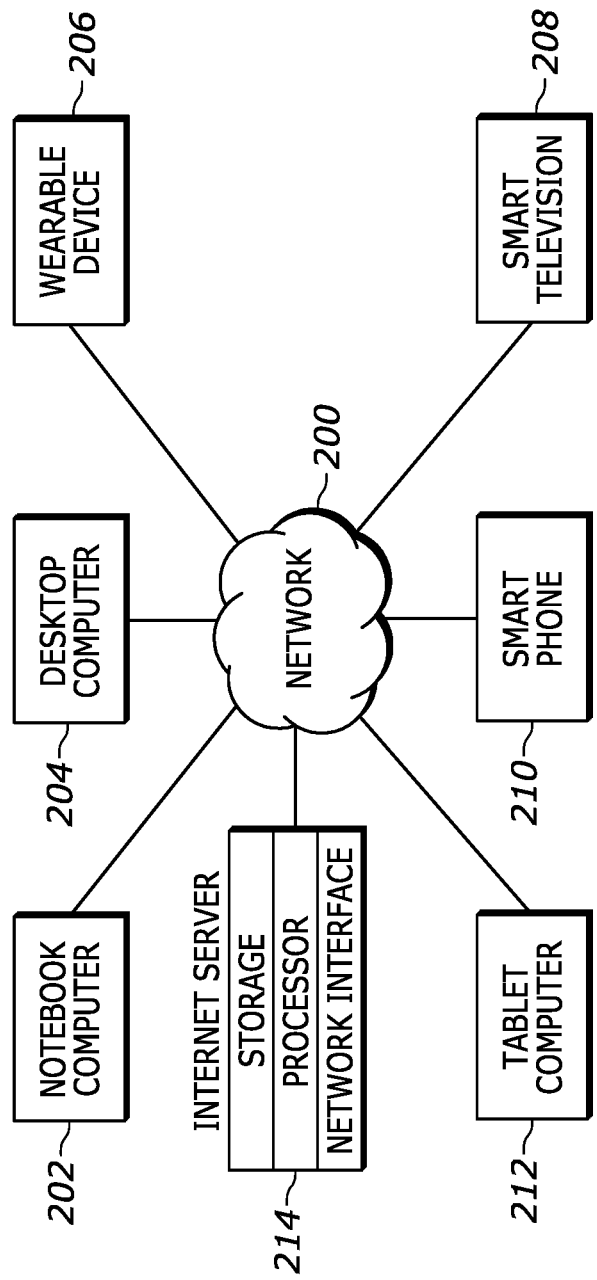
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch and/or fitness tracker, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
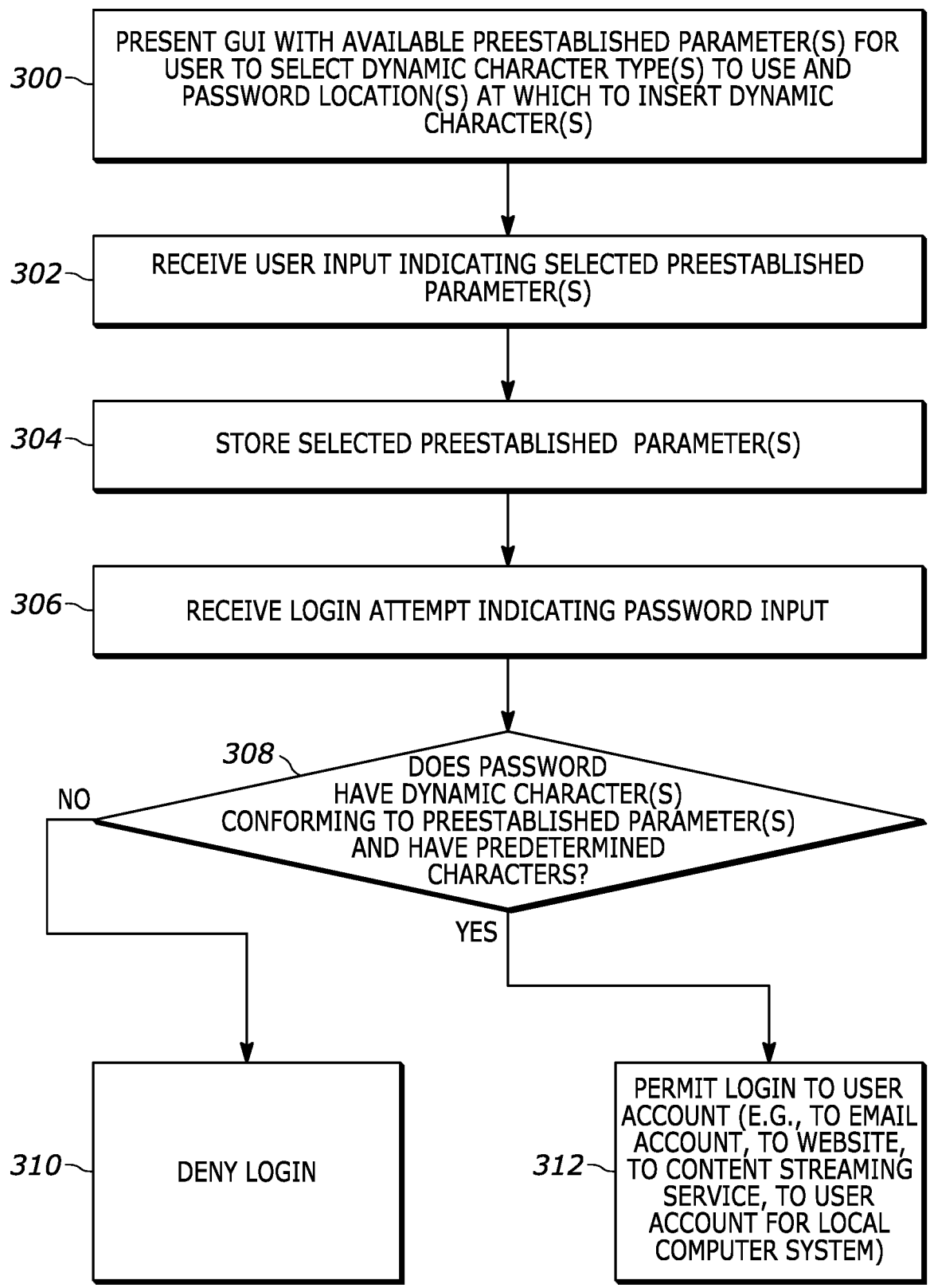
FIG. 3 is a flow chart of an example algorithm for permitting login using a password with one or more dynamic characters in accordance with present principles.

Referring to FIG. 3, it shows example logic that may be executed by a device facilitating login to a user account in accordance with present principles. The device may be established by, e.g., the system 100 and/or the server 214.

Beginning at block 300, the device may present a graphical user interface (GUI) to the user, e.g., via a website or user account information window the user is able to access via his or her respective device to set a password for accessing the user's electronic account. The GUI may list the available preestablished parameters from which the user may choose, and each parameter that is presented may be related to a different type of dynamic character the user may use as part of his or her password. For example, one parameter may relate to a current time of day while another parameter may relate to a current day of the week or month (e.g., spelled backwards or forwards). The GUI may also indicate locations within the password at which the dynamic characters are to be entered. The parameters and locations may be selected by, e.g., a system administrator managing the user account.

From block 300 the logic may then move to block 302 where the device may receive user input via the GUI that indicates the user's selections of parameters and password locations. Thereafter, the logic may move to block 304 where the device may securely store data indicating the user's selections. For example, the device may store the data using an encryption algorithm.

From block 304 the logic may then proceed to block 306 where, at a later time, an attempt to login to the user's account is received, with the login attempt indicating password input and also possibly a user name and other information. From block 306 the logic may then move to decision diamond 308.

At diamond 308 the device may determine whether the password input received at block 306 has one or more dynamic characters conforming to the preestablished parameters previously selected by the user and also whether the dynamic characters have been provided at the preselected locations within the password, Additionally, the device may determine at diamond 308 whether one or more predetermined and static characters have also been received at their preselected locations within the password.

For instance, if the preestablished parameters that were preselected were current time of day as specified at the end of the password, at diamond 308 the device may determine whether the predetermined characters were indicated in their correct sequence and that the password concluded with the current time of day when the password was received.

Responsive to a negative determination at diamond 308, the logic may move to block 310 where the device may deny the login attempt and possibly take one or more other security measures such as requiring a password reset, transmitting a notification to the user that an unsuccessful login attempt was made, freezing the user account until the user can change the password, etc.

However, responsive to an affirmative determination at diamond 308, the logic may instead move to block 312 where the device may permit the login attempt and thus log the user in to the user account. The user account may be, for example, a web-based email account, a content streaming service account, or another account accessible via a website or Internet connection, such as an e-commerce website user account. The account may even be a user account for local login to a particular workstation computer, home computer, cell phone, or other terminal using a physical or soft keyboard, where the password is not transmitted elsewhere as part of the login but instead is simply used to login to the device itself to access the device, its storage, and its local functions/applications.

Figure 4:
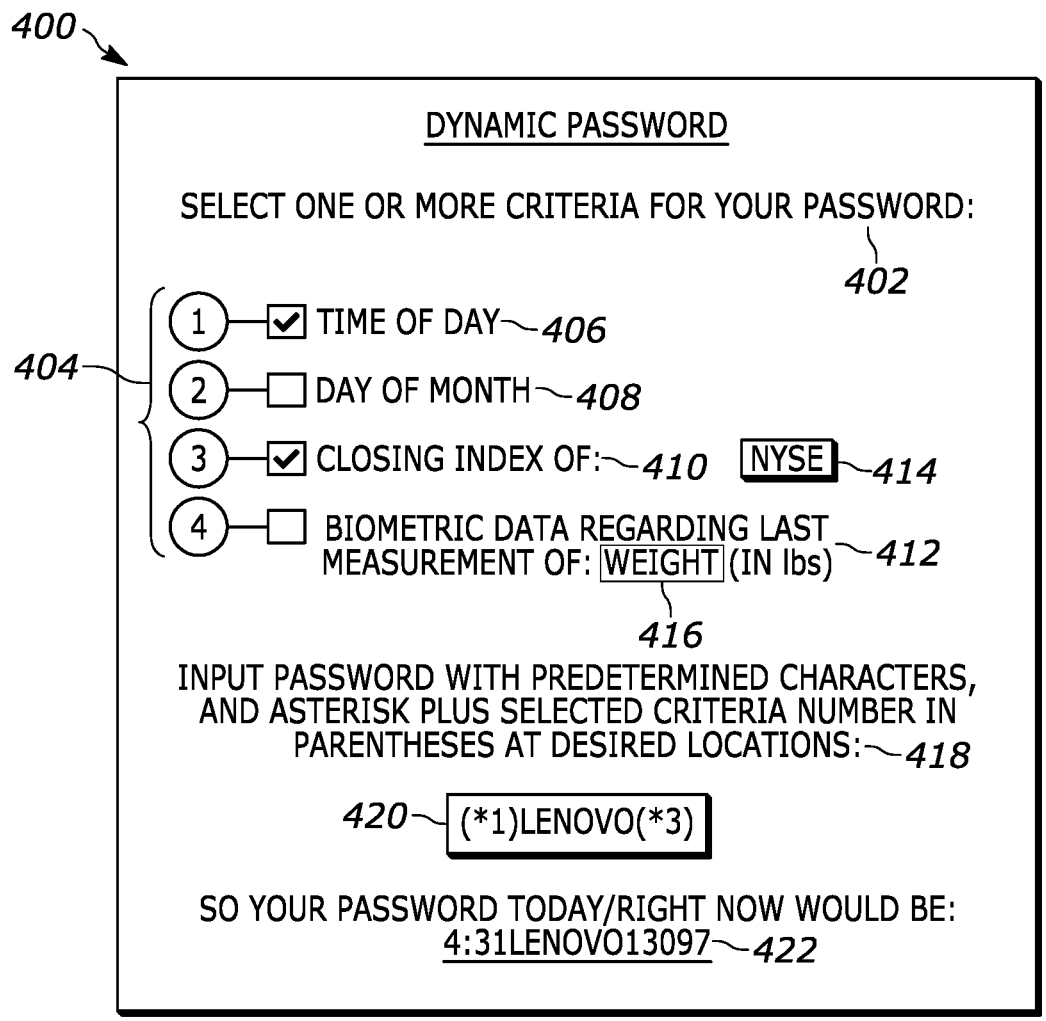
FIG. 4 shows an example graphical user interface (GUI) presentable on a display for a user to set a password with one or more dynamic characters in accordance with present principles.

FIG. 4 shows an example of a GUI 400 that may be presented on an electronic display, e.g., at block 300 according to the description above. The GUI 400 may include a prompt 402 instructing the user to select one or more parameters/criteria to use as part of the user's password for login to the user's account. Each criterion may be associated with a different number or other identifier 404, e.g., one through four as shown. It is to be understood that each parameter/criterion may be selected by directing touch input or cursor input to the check box shown adjacent to the respective criterion.

In the example shown, example criteria may include current time of day 406, current day of the month 408, the previous day's closing value of an index for a particular stock exchange 410, and certain biometric data 412. As also shown, in this example the user has checked the check boxes for criterion one and criterion three, thereby selecting those criteria. It is to be further understood that the relevant data that might dynamically change for a given criterion may be identified when determining whether to permit login by accessing a publicly-available source of information indicating the data or accessing another source to which the device has access that indicates the data. Example sources will be discussed further below.

Thus, regarding criteria 406 and 408 for example, the device or system managing account login may have access to these types of information via a clock or calendar application accessible to the device or via a public website of an official government agency.

Regarding the criterion 410, note first that in some embodiments the user may select a particular stock exchange by selecting the box 414, which may in turn cause a drop-down menu to be presented from which the user may select a particular stock exchange for use of the closing value of its index. The device or system managing account login may then access the relevant stock information by accessing it over the Internet where it is published publicly, such as via the relevant stock exchange's own website or via a financial news website.

Regarding the criterion 412, first note that the user may select a particular type of biometric data to use by selecting the box 416, which may in turn cause a drop-down menu to be presented from which the user may select a particular type of biometric data to use. For example, the user may select use of a most-recently logged weight of the user as logged by a fitness tracker or a most-recently logged heart rate as logged by a fitness tracker. Additionally or alternatively, the particular type of biometric data may be the total number of steps the user walked and had logged the previous day. Then the device or system managing account login may have access to these types of information, e.g., if transmitted by the fitness tracker to the device or if stored in a cloud storage location accessible to the device.

Still in reference to FIG. 4, the GUI 400 may also include instructions 418 for a user to provide his or her desired password structure in input box 420, which may include both locations within the password at which dynamic characters are to be placed that correspond to selected criteria as well as predetermined characters that are to be placed at other locations. The predetermined characters may not change as the dynamic characters do and may be static in the sense that they may not change until a user changes them through a password reset process or other user action. The instructions 418 may also indicate how the user is to denote locations for the dynamic characters, such as by indicating them in parentheses and preceded by an asterisk so that the server or other user account system can decipher the user's intended placement within the password of dynamic characters for various criteria that have been selected.

In the example shown in FIG. 4, the user has indicated via text input box 420 that initial characters for the password should include the current time of day at the time a future login attempt is made by indicating "(*1)" in the box 420. The user has also indicated via box 420 that last characters for the password should include the closing value of the New York Stock Exchange index by indicating "(*3)" in the box 420. As also shown, predetermined characters spelling "Lenovo" are included between the dynamic characters at the beginning and end of the password.

As also shown in FIG. 4, based on the user entering the password structure into box 420, the GUI 400 may present an example 422 of what the user's password would be for account login at the current time and date based on the criteria set by the user via box 420. Assuming the current time is 4:31 p.m. and the previous day's closing value of the NYSE index was 13,097, the user's password for that moment would be "4:31 Lenovo13097".

Figure 5:
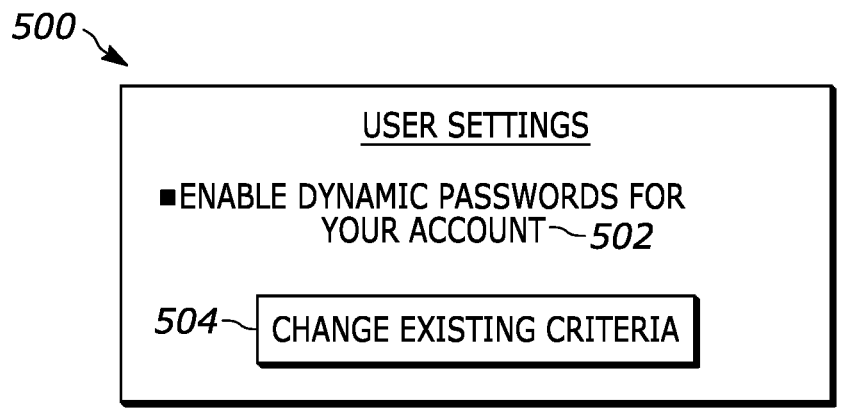
FIG. 5 is a GUI presentable on a display for a user to configure one or more settings for dynamic password use in accordance with present principles.

Now describing FIG. 5, it shows an example GUI 500 that may be presented on the electronic display of a user's device for configuring settings related to login to the user's account. As shown, the GUI 500 may include a first setting 502 that is selectable via the adjacent check box to enable dynamic password use for the user's account. Thus, selection of the setting 502 may configure the user's account to require login using a password with one or more dynamic characters as disclosed herein. For example, selection of the setting 502 may configure a server or other device managing the user's account to undertake the logic of FIG. 3 as set forth above.

The GUI 500 may also include a selector 504. The selector 504 may be selectable for the user to update or change his or her password for the account. For example, the selector 504 may be selected to command the user's device to present the GUI 400 of FIG. 4 for the user to set a new password.

Figure 6:
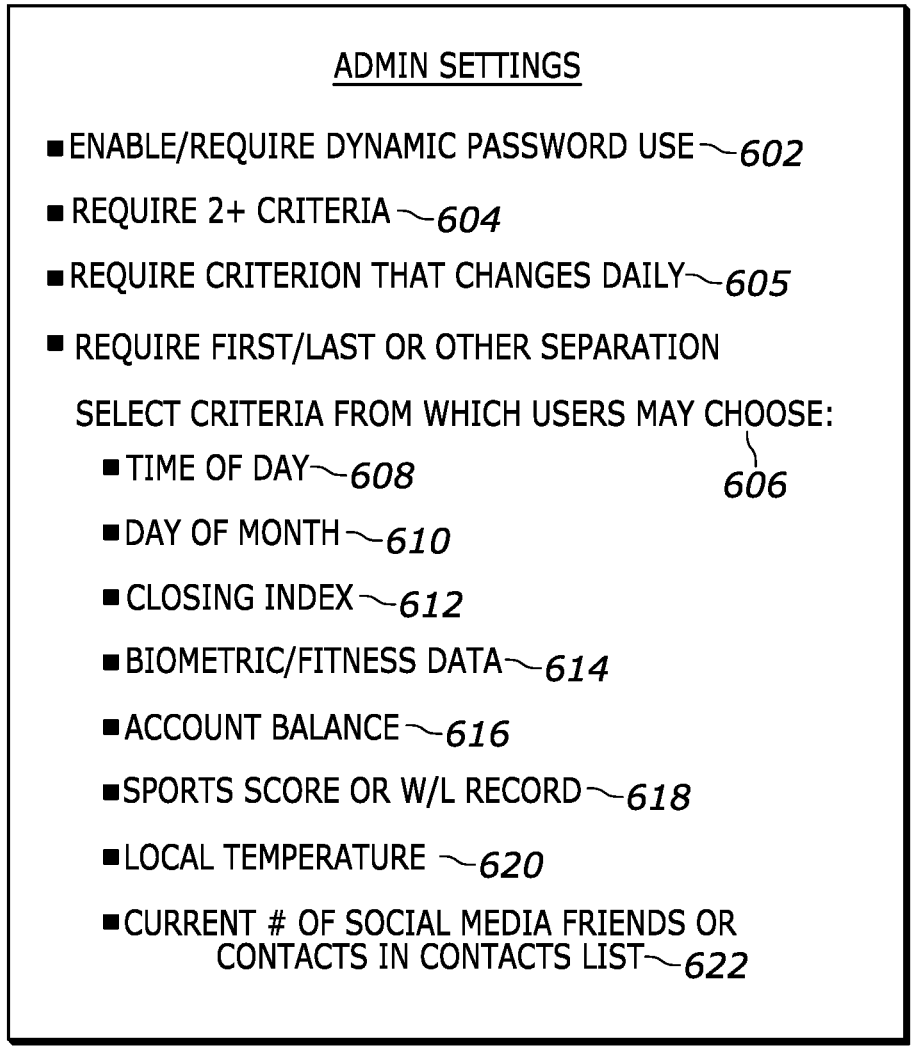
FIG. 6 is a GUI presentable on a display for a system administrator to configure one or more settings for dynamic password use for accounts managed by the system administrator in accordance with present principles.

Now describing FIG. 6, it also shows an example settings GUI 600 that may be presented on an electronic display, but with the GUI 600 being related to settings configurable by a system administrator or other person in charge of managing various user accounts associated with a particular system or service, such as an email service, content streaming service, etc. It is to be understood that each setting or option to be discussed below may be selected by directing touch or cursor input to the adjacent check box for the respective setting or option.

The GUI 600 may include a first setting 602 that is selectable to enable or require users of the system to use passwords with dynamic characters in accordance with present principles in order to access their respective accounts. The GUI 600 may also include a setting 604 that is selectable to require users to use passwords that include two or more different dynamic characters conforming to different criteria to further enhance security. Still further, the GUI 600 may include a setting 605 that is selectable to require users to use passwords having dynamic characters that change daily as another way to further enhance security. As yet another example, the GUI 600 may include a setting 606 that is selectable to require users to use passwords that have dynamic characters as initial and last characters of a password or at least to require users to use passwords with dynamic characters that are separated in the password by predetermined characters as yet another way to further enhance security.

Still in reference to the GUI 600, it may also include various options for respective criteria from which the system administrator may choose in order to enable the system to present the selected criteria as a criteria available for use by a user to login to the user's account e.g., via the GUI 400). Thus, the options may include a time of day option 608, a day of the month option 608, a closing stock exchange index value 610, and biometric or fitness data for the user 614. Other example criteria are indicated by an account balance option 616 to use a balance such as a U.S. dollar amount or crypto-currency balance for a checking account or e-commerce account accessible online, and an option 618 to use a most-recent sports score or win-loss record for a particular sports team specified by a given user.

Another example criterion is indicated by option 620, which is selectable to enable use the current temperature (or daily high or low temperature) in Fahrenheit or Celsius for a current location at which the user is disposed as may be determined based on GPS coordinates for the user's device (assumed to be proximate the user) and matching temperature data for a location indicated by the GPS coordinates. Additionally or alternatively, rather than using current location, the temperature may relate to a location preselected by the user, such as the user's hometown or work location.

Two other example criteria that may be used are indicated by option 622. Option 622 may be selectable to enable use of a current number of friends the user has through a given social network service or to use a current number of contacts that the user has in a contacts list (e.g., for a particular email account).

Though only the criteria described above are shown in FIG. 6 for simplicity, it is to be understood that still other criteria may be used. For example, the time at which a user's next appointment is scheduled to occur may be used, as indicated in an electronic calendar for the user that is accessible to the system. As another example, a current day of the week may be used as a criterion, e.g., Sunday, Monday, Tuesday, Wednesday, Thursday, Friday, or Saturday.

It may now be appreciated that present principles provide for an improved computer-based user interface that improves computer security and ease of computer use. The disclosed concepts are thus rooted in computer technology.

It is also to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least a first device, comprising:
at least one processor; and
storage accessible to the at least one processor and comprising instructions executable by the at least one processor to:
present a graphical user interface (GUI) on a display, the GUI comprising a prompt instructing a user to select one or more preestablished parameters to use that correspond to respective dynamic characters that are to form part of a password to permit a login via the first device, the GUI listing at least two preestablished parameters that are each respectively selectable from the GUI to establish the respective preestablished parameter selected from the GUI as a preestablished parameter to use for the password;
receive password input;
determine whether the password input indicates at least one predetermined character and at least one dynamic character that conforms to at least one preestablished parameter selected from the GUI; and
responsive to a determination that the password input indicates the at least one predetermined character and at least one dynamic character that conforms to the at least one preestablished parameter selected from the GUI, permit a login via the first device.

2. The first device of claim 1, wherein the first device is established by a server, and wherein login is for one or more of: login to an email account, login to a content streaming service, login to a website.

3. The first device of claim 1, wherein the GUI presents an example of what the user's password would be for login according to current data that corresponds to the respective preestablished parameter(s) selected from the GUI.

4. The first device of claim 1, wherein at least one preestablished parameter listed on the GUI pertains to a closing value of a financial index on the day before the password input is received.

5. The first device of claim 1, wherein at least one preestablished parameter listed on the GUI pertains to a logged weight of the user.

6. The first device of claim 1, wherein at least one preestablished parameter listed on the GUI pertains to a logged heart rate of the user.

7. The first device of claim 1, wherein at least one preestablished parameter listed on the GUI pertains to a total number of steps the user walked and had logged the previous day relative to when the password input is received.

8. A method, comprising:
presenting a graphical user interface (GUI) on a display, the GUI comprising a prompt instructing a user to select one or more criteria to use that correspond to respective dynamic characters that are to form part of a password to permit login, the GUI listing at least two criteria that are each respectively selectable from the GUI to establish the respective criterion selected from the GUI as a criterion to use for the password;
receiving, at a first device, a first login attempt;
determining whether the first login attempt indicates a password comprising at least one predetermined character and at least one dynamic character that conforms to at least one criterion selected from the GUI, both the at least one predetermined character and the at least one criterion selected from the GUI being associated with a particular user account for which the first login attempt is made; and
logging into the user account responsive to determining that the password provided as part of the first login attempt indicates the at least one predetermined character and at least one dynamic character that conforms to the at least one criterion selected from the GUI.

9. The method of claim 8, wherein at least one criterion listed on the GUI pertains to a closing value of a financial index on the day before the first login attempt is received.

10. The method of claim 8, wherein the GUI presents an example of what the password would be according to current data that corresponds to the respective criteria selected from the GUI.

11. The method of claim 8, wherein at least one criterion listed on the GUI pertains to a most-recently logged weight of the user.

12. The method of claim 8, wherein at least one criterion listed on the GUI pertains to a most-recently logged heart rate of the user.

13. The method of claim 8, wherein at least one criterion listed on the GUI pertains to a total number of steps the user walked and had logged the previous day relative to when the first login attempt is made.

14. The method of claim 8, wherein the user account comprises one or more of: an email account, a content streaming service account, a website account.

15. A computer readable storage medium (CRSM) that is not a transitory signal, the computer readable storage medium comprising instructions executable by at least one processor to:
present a graphical user interface (GUI) on a display, the GUI comprising a prompt instructing a user to select one or more preestablished criteria to use that correspond to respective dynamic characters that are to form at least part of a password to permit login to a particular user account, the GUI listing at least two preestablished criteria that are each respectively selectable from the GUI to establish the respective preestablished criterion selected from the GUI as a preestablished criterion to use for the password;
receive, at a device, a first login attempt to the particular user account; and
permit login to the particular user account responsive to a determination that the first login attempt indicates the password according to at least one dynamic character that conforms to at least one preestablished criterion selected from the GUI.

16. The CRSM of claim 15, wherein the GUI presents an example of what the password would be according to current data that corresponds to the respective preestablished criteria selected from the GUI.

17. The CRSM of claim 15, wherein at least one preestablished criterion listed on the GUI pertains to a closing value of a financial index on the day before the first login attempt is made.

18. The CRSM of claim 15, wherein at least one preestablished criterion listed on the GUI pertains to a most-recently logged weight of a user.

19. The CRSM of claim 15, wherein at least one preestablished criterion listed on the GUI pertains to a most-recently logged heart rate of a user.

20. The CRSM of claim 15, wherein at least one preestablished criterion listed on the GUI pertains to a total number of steps a user logged the previous day relative to when the first login attempt is made.

* * * * *